K. MATHEUS.
FLUE WELDING MACHINE.
APPLICATION FILED JULY 21, 1908.

937,083.

Patented Oct. 19, 1909.
2 SHEETS—SHEET 1.

Witnesses:

Inventor:
Karl Matheus

K. MATHEUS.
FLUE WELDING MACHINE.
APPLICATION FILED JULY 21, 1908.
937,083.
Patented Oct. 19, 1909.
2 SHEETS—SHEET 2.
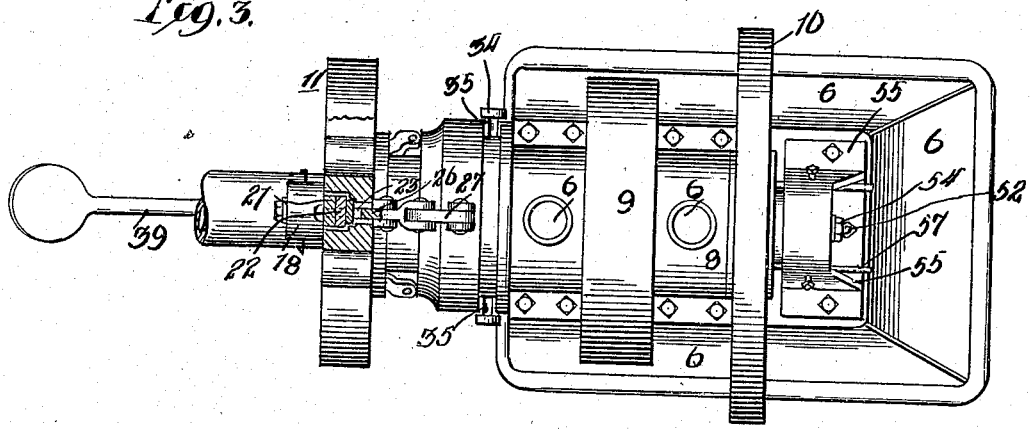
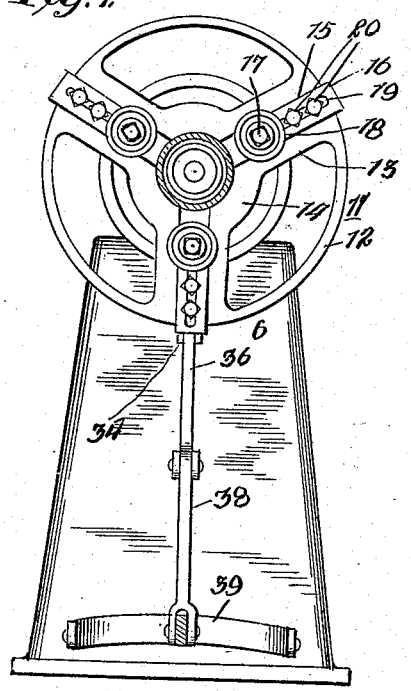
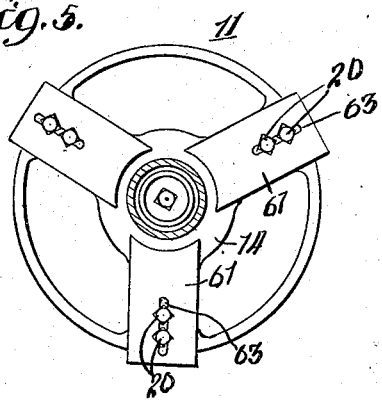

UNITED STATES PATENT OFFICE.

KARL MATHEUS, OF CHICAGO, ILLINOIS.

FLUE-WELDING MACHINE.

937,083.      Specification of Letters Patent.      Patented Oct. 19, 1909.

Application filed July 21, 1908. Serial No. 444,614.

*To all whom it may concern:*

Be it known that I, KARL MATHEUS, a citizen of the United States, residing at Chicago, in the county of Cook and State of Illinois, have invented certain new and useful Improvements in Flue - Welding Machines, of which the following is a specification.

In machines of the class to which the present invention belongs, it is customary to flare the end of one of the tube sections and crimp the end of the other, which permits one of the sections to be inserted slightly into the end of the other in preparation for the welding operation. The sections thus positioned and heated to welding heat are thereafter inserted onto a mandrel and welded together by the action of revolving rollers which are brought to bear upon the tube or flue sections at the point of welding.

The object of the present invention is to so mount the rollers that they will have a straight line of movement toward and from the welding point and will be rigidly held and guided in their line of travel.

Further objects of the invention are, to improve the means provided for simultaneously moving all of the rollers toward and from the mandrel, and to improve the construction and arrangement of the mounting provided for the head carrying the rollers.

Further objects will appear from a detailed description of the invention, which consists in the features of construction and combination of parts hereinafter described and claimed.

Figure 1:
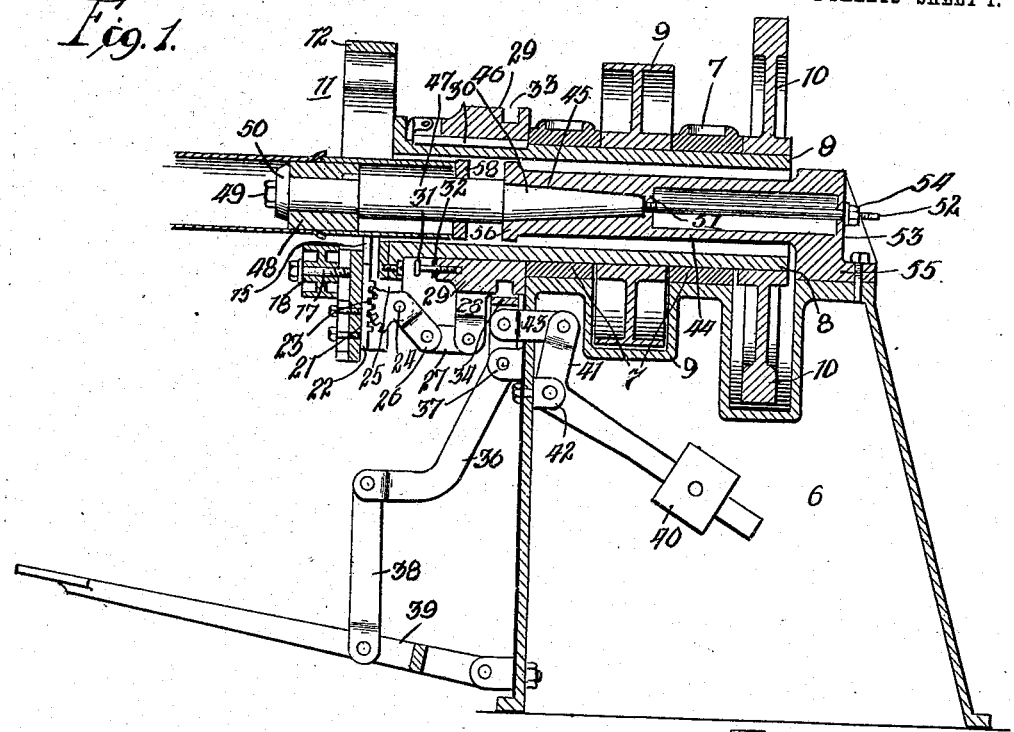
Figure 2:
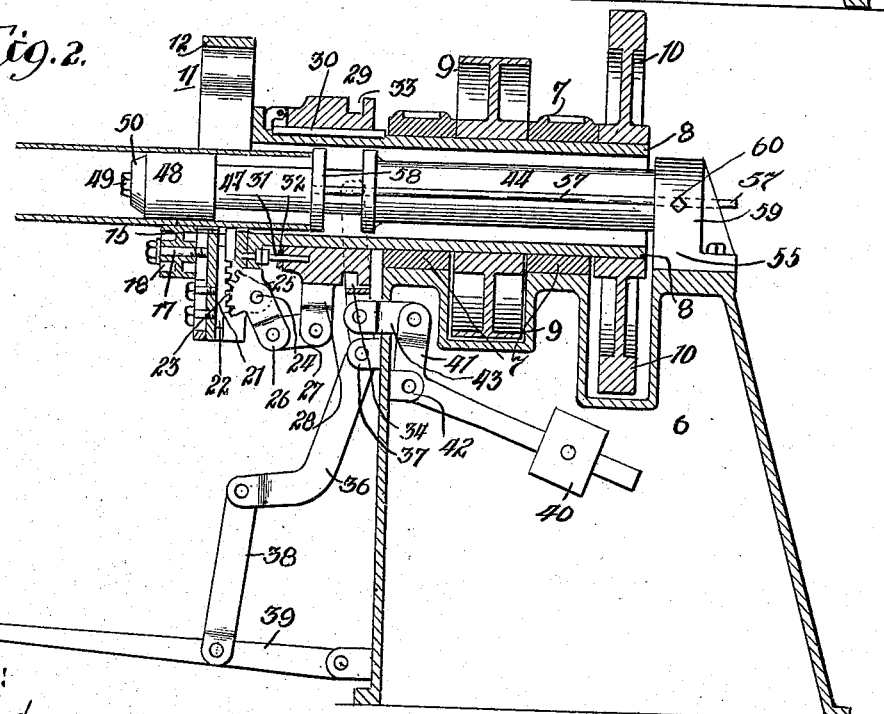

In the drawings, Figure 1 is a longitudinal sectional elevation of the machine with the rollers in initial position; Fig. 2 a similar view showing the rollers in compressing position; Fig. 3 a top or plan view of the machine; Fig. 4 a forward end elevation thereof; and Fig. 5 a view showing the use of crimping plates in place of the rollers.

The machine comprises a base 6 of suitable height and shape to provide a firm mounting for the mechanism. The base is provided with a pair of bearing rings 7 which serve to rotatably mount a tubular shaft 8 provided, intermediate the bearings, with a pulley 9, and provided, to the rear of the bearings, with a fly wheel 10. At the forward end of the tubular shaft is located a head 11 in the form of a wheel having a rim 12, and three arms of spokes 13 connecting with a center hub 14, although obviously the spaces, intermediate the arms or spokes, could be solid if desired. Furthermore, a number of arms or spokes other than three could be employed if desired. Each of the arms is provided with a radially extending guide slot 15, which has entered thereinto a slide plate 16 provided, near its inner end, with an outwardly extending pin 17 which provides a journal mounting for a welding roller 18. The slide plate is provided, in its center, with a slot 19, through which are entered a pair of clamping bolts 20 which connect the slide plate with an inner plate 21 having on its inner surface a rack 22.

The slide plate and the inner plate are adjustable with respect to one another, so that the position of the welding roller can be adjusted without shifting the position of the rack. The rack is in mesh with a mutilated pinion 23 which is mounted on a pivot pin 24 entered through ears 25 between which the pinion is located. The pinion has rearwardly extending therefrom an arm 26 which has pivoted thereto a link 27, which in turn is pivoted to an arm 28 outwardly extending from an actuating collar 29 which is slidably mounted by means of an elongated spline 30 on the forward end of the tubular shaft just behind the head 11. The forward movement of the actuating collar is limited by means of a headed screw bolt 31 adapted to be maintained in adjusted position by means of a jam nut 32. The actuating collar is provided, near its rear edge, with a groove 33, which grooved portion of the collar is embraced by a forked lever 34 having inwardly extending fingers 35, which enter the groove and serve to impart a sliding movement to the collar without interfering with its rotation. The forked lever terminates in a depending L lever arm 36, which is pivoted, near its upper end, between a pair of ears 37 formed on the front of the base portion of the machine. The lower or horizontal end of the L lever has pivoted thereto a link 38 which connects with a pivoted foot treadle 39. In order to return the parts to normal position, a counterweight 40, mounted on the long arm of an L lever 41, is employed, which L lever is located inside of the base of the machine and is pivoted, at its bend or elbow, between a pair of ears 42 secured to the wall of the base. The short arm of the lever 41 is connected with the L lever 36, above the pivotal mounting thereof, by means of a link 43.

The tubular shaft surrounds a mandrel supporting member 44 provided, in its forward end, with a tapered hole 45 adapted to receive the tapered end 46 of a mandrel 47. The mandrel is provided with an enlarged head 48 adapted to be clamped to the end of the mandrel by means of a bolt 49 entered through a washer 50, the construction being one whereby heads of different sizes can be used in connection with the same mandrel shank or stem. The tapered inner end of the mandrel shank abuts against a cross wall 51 which has entered therethrough the forward end of a rod 52, which is adapted to be threaded into the end of the mandrel shank. The outer end of the rod is entered through the rear wall 53 of the mandrel supporting member and has threaded thereon a nut 54 which serves to hold the rod in position. The mandrel supporting member, at its rear end, outside of the tubular shaft, is provided with a base lug 55 which is bolted onto the top of the base 6 and is of suitable size to rigidly hold the mandrel supporting member in position within the tubular shaft and out of contact therewith without the provision of other means of support. The forward end of the mandrel supporting member is provided with a flange 56 through the sides of which are entered a pair of guide rods 57 which carry, at their forward ends, a stop collar 58 adapted to furnish an abutment for the inner end of the short tube or flue section. The rear ends of the rods 57 are entered through the sides 59 of the base lug 55 and are adapted to be held in adjusted position by means of set screws 60, as shown in Fig. 2.

In use, the machine will be driven from the pulley or belt wheel 9, which rotates the tubular shaft carrying the fly wheel 10 and the slidable collar 29. The stop collar 58 will be adjusted to a suitable position to receive the short inner tube or flue section which will be positioned at its end, inside of the rollers and resting upon the surface of the mandrel head 58. The companion tube or flue section may then be positioned on the mandrel head, after which a movement of the foot lever will forwardly project the sliding collar, which movement of the collar will actuate the links 27 and simultaneously swing all of the mutilated pinions in the proper direction, to inwardly project the slide plates toward the flue. This gives a direct straight line movement to each of the slide plates, and causes all three of the rollers to simultaneously and uniformly contact the surface to be welded. The method of mounting the tubular shaft and the mandrel supporting member is one which gives great compactness and stability to the machine, and enables a heavy pressure to be applied to the welding rollers which are so mounted as to prevent any deflection from their true position. When it is desired to crimp the end of the tube or flue preparatory to the welding operation, the rollers can be removed and crimping plates 61, having concave crimping ends 62, substituted therefor. The crimping plates are provided with slots 63 adapted to receive the bolts 20, as shown in Fig. 5. The plates are of proper size to contact the tube or flue around its entire surface, and the crimping operation is performed in the manner heretofore described, save only that the machine is not rotated during the crimping operation.

What I regard as new and desire to secure by Letters Patent is:

1. In a welding machine, a rotatably mounted head, means for revolving the head, a plurality of welding rollers slidably mounted on the head, racks connected with the rollers, gears meshing with the racks, and means for actuating the gears, substantially as described.

2. In a welding machine, the combination of a head rotatably mounted, plates slidably mounted on the head and adapted to have a radial movement, welding rollers mounted on the plates, racks connected with the plates, gears in mesh with the racks, and means for imparting movement to the gears, substantially as described.

3. In a welding machine, the combination of a head rotatably mounted, plates slidably mounted on the head and adapted to have a radial movement, welding rollers mounted on the plates, racks connected with the plates, gears in mesh with the racks, links connected with the gears, a sliding collar to which the links are pivoted, and means for imparting a sliding movement to the collar, substantially as described.

4. In a welding machine, the combination of a tubular shaft, a journal mounting for the shaft, a head on the shaft, slide plates mounted on the head and adapted to have a radial movement, members carried by the plates and adapted to engage a tube or flue, racks connected with said plates, gears in mesh with said racks, and means for actuating said gears, substantially as described.

5. In a welding machine, the combination of a tubular shaft provided with a head, plates slidably mounted on said head and adapted to have a radial movement, members carried by said plates, racks on said plates, gears meshing with said racks, and means for actuating said gears, substantially as described.

6. In a welding machine, the combination of a tubular shaft provided with a head, plates slidably mounted on said head and adapted to have a radial movement, members carried by said plates, racks on said plates, gears meshing with said racks, a collar slidably mounted on the tubular shaft, connections between said collar and gears for actuating the latter by a movement of the former, and means for imparting a sliding movement to said collar, substantially as described.

7. In a machine of the class described, the combination of a rotatably mounted head, a slide plate carried by said head, a member carried by said slide plate, a rack on said slide plate, a gear in mesh with said rack, and means for actuating said gear, substantially as described.

8. In a welding machine, the combination of a tubular shaft open at its end, a journal mounting for said shaft, a mandrel socket projecting into the open end of said shaft, a rigid mounting for said mandrel socket, a mandrel entered into said socket, a stop collar surrounding said mandrel, rods supporting said stop collar and adjustably carried by said mandrel socket, members connected with the tubular shaft and adapted to co-act with the mandrel, and means for imparting to said members a radial movement with respect to the mandrel, substantially as described.

KARL MATHEUS.

Witnesses:
WALKER BANNING,
PIERSON W. BANNING.